(12) United States Patent
Jung et al.

(10) Patent No.: US 8,638,757 B2
(45) Date of Patent: Jan. 28, 2014

(54) METHOD FOR UPDATING SYSTEM INFORMATION DURING HAND-OVER IN BROADBAND WIRELESS ACCESS SYSTEM

(75) Inventors: In Uk Jung, Anyang-si (KR); Yong Ho Kim, Anyang-si (KR); Ki Seon Ryu, Anyang-si (KR); Hee Jeong Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 133 days.

(21) Appl. No.: 13/203,555

(22) PCT Filed: Feb. 26, 2010

(86) PCT No.: PCT/KR2010/001240
§ 371 (c)(1),
(2), (4) Date: Sep. 14, 2011

(87) PCT Pub. No.: WO2010/098623
PCT Pub. Date: Sep. 2, 2010

(65) Prior Publication Data
US 2011/0317665 A1    Dec. 29, 2011

Related U.S. Application Data

(60) Provisional application No. 61/155,525, filed on Feb. 26, 2009, provisional application No. 61/294,108, filed on Jan. 12, 2010, provisional application No. 61/302,555, filed on Feb. 9, 2010.

(30) Foreign Application Priority Data

Feb. 26, 2010    (KR) ........................ 10-2010-0017758

(51) Int. Cl.
*H04W 4/00*    (2009.01)
(52) U.S. Cl.
USPC ............................. 370/331; 370/390; 370/432
(58) Field of Classification Search
None
See application file for complete search history.

(56) References Cited

U.S. PATENT DOCUMENTS 7,653,393 B2 *    1/2010  Kim et al. .................. 455/437
(Continued)

FOREIGN PATENT DOCUMENTS

| CN | 101156466 A | 4/2008 |
| KR | 2009-0013275 A | 2/2009 |

OTHER PUBLICATIONS 802.16m Superframe Aligned MAC Layer Handover Procedures, IEEE C802.16m-08/796, http://ieee802.org/16 (LG Electronics Inc.) Jul. 7, 2007, pp. 1-6.
Proposal for IEEE 802.16m Control Structure Framework, IEEE C802. 16m-08/173, http://ieee802.org/16 (Nortel Networks) Mar. 10, 2008, pp. 1-15.

(Continued)

*Primary Examiner* — Robert Wilson
(74) *Attorney, Agent, or Firm* — Morgan, Lewis & Bockius LLP

(57) ABSTRACT

The present invention relates to a broadband wireless access system, and more particularly, to a method for efficiently acquiring system information on a target base station during a hand-over, and to an apparatus for carrying out the method. One method for enabling a mobile station to update system information on a target base station during a hand-over, according to one embodiment of the present invention, comprises the steps of: receiving, from a serving base station, a broadcast message containing system information on at least one neighbor base station including the target base station, and containing first change count information for indicating whether or not to update the system information; and receiving, from the serving base station, second change count information for indicating whether or not to update the system information currently possessed by the serving base station.

16 Claims, 8 Drawing Sheets

(56) References Cited

U.S. PATENT DOCUMENTS

| | | | |
|---|---|---|---|
| 2005/0059437 A1 | 3/2005 | Son et al. | |
| 2006/0149794 A1* | 7/2006 | Ylinen | 707/203 |
| 2007/0054667 A1 | 3/2007 | Lee et al. | |
| 2009/0005099 A1* | 1/2009 | Jung et al. | 455/517 |
| 2009/0017821 A1* | 1/2009 | Lee | 455/436 |
| 2011/0317665 A1* | 12/2011 | Jung et al. | 370/331 |
| 2013/0090118 A1* | 4/2013 | Jung et al. | 455/436 |

OTHER PUBLICATIONS

Dedicated Ranging Opportunity for RS, IEEE C802.16j-07/175, http://ieee802.org/16 (Posdata Co.) Mar. 5, 2007, pp. 1-6.
International Search Report for PCT/KR2010/001240.
Notification of the First Office Action dated Oct. 8, 2013 from the State Intellectual Property Office of the People's Republic of China in counterpart Chinese Application No. 201080017544.9.

* cited by examiner

METHOD FOR UPDATING SYSTEM INFORMATION DURING HAND-OVER IN BROADBAND WIRELESS ACCESS SYSTEM

This application is a national stage application of PCT Application No. PCT/KR2010/001240, filed on Feb. 26, 2010, which claims the benefit of U.S. Provisional Application Nos. 61/155,525, filed on Feb. 26, 2009, 61/294,108, filed Jan. 12, 2010, and 61/302,555, filed Feb. 9, 2010. The present national stage application also claims the benefit of Korean Patent Application No. 10-2010-0017758, filed Feb. 26, 2010.

TECHNICAL FIELD

The present invention relates to a broadband wireless access system, and more particularly, to a method for efficiently acquiring system information on a target base station during a hand-over, and to an apparatus for carrying out the method.

BACKGROUND ART

Handover (HO) means that a mobile station moves from air interface of a base station to air interface of another base station. A handover process in the conventional IEEE 802.16e system is described below.

In an IEEE 802.16e network, a serving base station (SBS) can broadcast neighbor base station information through a neighbor advertisement (MOB_NBR-ADV) message to inform a mobile station (MS) of information (topology) about fundamental network configuration.

The MOB_NBR-ADV message contains system information on the serving base station and neighbor base stations, for example, a preamble index, frequency, a degree of hand-over optimization, downlink channel descriptor (DCD)/uplink channel descriptor (UCD) information, etc.

The DCD/UCD information includes information that the mobile station should know in order to transmit/receive information through a downlink and an uplink. For example, the DCD/UCD information includes hand-over trigger information, MAC (Medium Access Control) version of a base station, MIH (Media Independent Hand-over) capability, etc.

More specifically, the DCD includes downlink burst profiles (DL_Burst_Profile) that is information used for the MS to decode a message transmitted from the BS. Since it is desirable that all MSs in the coverage of the corresponding BS can receive messages broadcasted by the BS, DL_Burst_Profile set value that is most robust to error is applied. Thus, the set value is barely changed. However, a message unicast-transmitted to each MS is sent as a set value suited to the channel state of each MS, and thus different DL_Burst_Profile set values may be sent to different MSs in case of unicast transmission. The UCD includes UL_Burst_Profiles used for the MS to transmit messages to the BS and may be set depending on a channel environment state.

As described above, in the conventional IEEE 802.16e system, system information is transmitted through the UCD of uplink and the DCD of downlink and may have a transmission period of a maximum of 10 seconds. At this time, when the system information is updated, the BS schedules such that all MSs recognize the updated system information at least once so as to prevent mismatch between system information possessed by the MSs and the system information of the base station. To achieve this, for the UCD, a period of UCD transition interval start and transition interval expired is defined and the BS transmits a new UCD in the period.

A process of enabling an MS which acquires system information of neighbor BSs through the aforementioned method to perform a hand-over in an IEEE 802.16e network is described in more detail.

A hand-over procedure in the conventional IEEE 802.16e may consist of three processes of hand-over initiation and preparation, hand-over execution, and hand-over completion.

An exemplary fundamental hand-over procedure which can be configured as above is explained with reference to FIG. 1.

FIG. 1 illustrates an exemplary hand-over procedure which can be performed in an IEEE 802.16e system.

Referring to FIG. 1, an MS may be linked to a serving base station (SBS) and exchange data with the SBS (S101).

The SBS may broadcast information on neighbor BSs to the MS through a MOB_NBR-ADV message (S102).

The MS may start to scan candidate hand-over base stations (HO BSs) using a hand-over trigger condition while communicating with the SBS. The MS may transmit a hand-over request (MOB_MSHO-REQ) message to request the SBS to perform a hand-over when a hand-over condition is satisfied, for example, when a predetermined hysteresis margin value is exceeded (S103).

The SBS may inform the candidate HO BSs corresponding to information included the MOB_MSHO-REQ message of hand-over request from the MS through an HO-REQ message (S104).

The candidate HO BSs may perform pre-processing for the MS that requests the hand-over and transmit information about the hand-over to the SBS through an HO-RSP message (S105).

The SBS may transmit the information about the hand-over, acquired through the HO-RSP message, from the candidate HO BSs to the MS through a MOB_BSHO-RSP message. Here, the MOB_BSHO-RSP message may contain information required to perform the hand-over, such as action time, hand-over identifier (HO-ID), a dedicated HO CDMA ranging code, etc.

The MS may determine one target BS from among the candidate HO BSs on the basis of the information included in the MOB_BSHO-RSP message received from the SBS. Accordingly, the MS can attempt to perform ranging by transmitting a CDMA code to the determined target BS (S107).

Upon reception of the CDMA code, the target BS may transmit information representing whether or not ranging is successfully performed and physical correction values through a RNG-RSP message (S108).

Subsequently, the MS may transmit a ranging request (RNG-RSP) message for authentication to the target BS (S109).

Upon reception of the ranging request message from the MS, the target BS may provide system information that can be used in the target BS, such as CID (Connection Identifier), to the MS through a ranging response message (S110).

When the target BS has successfully performed authentication of the MS and transmitted all update information, the target BS may inform the SBS of the MS whether the hand-over is successfully performed through a hand-over completion (HO-CMPT) message (S111).

The MS can exchange information with the target BS to which the hand-over has been performed (S112).

For an IEEE 802.16m system, names and/or functions of medium access control (MAC) management messages used in the above-described hand-over procedure are changed.

A hand-over procedure which can be performed in the IEEE 802.16m system is similar to the above-described handover procedure of the IEEE 802.16e system. However, names and/or functions of MAC management messages are changed as follows.

MOB_NBR-ADV→AAI_NBR-ADV: this message includes system information transmitted in the form of an S-SFH not DCD/UCD.

MSHO-REQ→AAI_HO-REQ

BSHO→AAI_HO-CMD

RNG-REQ (CDMA code)→Ranging preamble code

RNG-RSP (ranging status)→AAI_RNG-ACK (ranging status)

RNG-REQ (MAC message)→AAI_RNG-REQ

RNG-RSP→AAI_RNG-RSP: this message includes a station identifier TSTID or STID instead of CID Furthermore, in the IEEE 802.16m system, system information of a BS is transmitted through a superframe header.

A frame structure and a superframe header of the IEEE 802.16m system will now be described.

FIG. 2 illustrates an example of a physical frame structure used in a wireless wide area network (WAN) mobile communication system based on an IEEE 802.16 system.

Referring to FIG. 2, a superframe has a length of 20 ms and is composed of four frames.

One frame includes eight subframes. The eight subframes may be divided into a downlink subframe region and an uplink subframe region including a predetermined number of subframes according to a downlink-to-uplink (DL/UL) ratio. When the UL/DL ratio is 5:3, as shown in FIG. 2, five subframes from among the eight subframes are allocated to downlink subframes SF0 to SF4 and the remaining three subframes are allocated to uplink subframes SF5 to SF7.

An idle time in which data symbols including data are not allocated, that is, a TTG (Transmit/receive Transition Gap) is present between the downlink subframe region and the uplink subframe region. Furthermore, an idle time, that is, an RTG (Receive/transmit Transition Gap) may follow the downlink subframe region. One subframe is composed of six OFDM symbols.

A BS and an MS may exchange data using the above frame structure. For example, the MS can receive data from the BS using downlink subframes and transmit data to the BS using uplink subframes. On the other hand, the BS can transmit data to the MS using downlink subframes and receive data from the MS using uplink subframes.

A superframe header can be transmitted to the MS through a first subframe of the superframe in the above frame structure. The superframe header may include resource allocation information composed of frames or subframes included in the superframe header or system information.

More specifically, in the IEEE 802.16m system, the superframe header (referred to as "SFH" hereinafter) may include essential system parameters, system configuration information, etc.

The SFH can be divided into a primary superframe header (P-SFH) and a secondary superframe header (S-SFH). The P-SFH transmitted for each superframe includes four least significant bits of a superframe number and information about an S-SFH transmitted in the corresponding superframe. The S-SFH transmits actual system information. The system information is divided into subpackets depending on the property thereof, and the subpackets are referred to as S-SFH SPn (n=1, 2, 3). S-SFH SP IEs are transmitted in different transmission periods $T_{SP1} < T_{SP2} < T_{SP3}$. Here, the system information is set values depending on communication environment such as ranging, power control, etc., which are required for the MS to perform downlink/uplink (DL/UL) transmission.

The information about the S-SFH, included in the P-SFH, may contain an S-SFH change count which represents the version of a currently transmitted S-SFH, an S-SFH scheduling information bitmap which represents whether or not the S-SFH is transmitted in the corresponding superframe, an S-SFH size which represents the number of logical resource units allocated for S-SFH transmission, an S-SFH number of repetitions, which represents the transmission format of the S-SFH, an S-SFH SP change bitmap which represents a changed S-SFH, etc. Here, field sizes of the S-SFH scheduling information bitmap and S-SFH SP change bitmap correspond to a total number of S-SFH SPs included in the corresponding superframe.

When the MS performs a hand-over to a specific target BS, a hand-over delay time may vary according to whether SFH information of the target BS, which is possessed by the MS, is updated or not. If the hand-over is performed in a state in which the MS has received an SFH of the target BS through an AAI_NBR-ADV message, the MS can directly perform network re-entry in the target BS to complete the hand-over.

However, the MS may not receive the AAI_NBR-ADV message including the SFH of the target BS or may receive an AAI_NBR-ADV message in which a change in the SFH of the target BS is not reflected yet. In this state, the MS which performs the hand-over receives all SFHs from the target BS before performing network re-entry. That is, the hand-over delay time increases by a time required for the MS to receive all S-SFH SP1, SP2 and SP3. In addition, hand-over optimization such as dedicate ranging using a dedicated ranging code or seamless hand-over cannot be performed.

In other words, if the MS cannot all the SFHs of the target base station or directly receives SFHs which are not updated from the target BS during the hand-over, the hand-over delay time may remarkably increase, and thus a minimum hand-over delay time specified by standardization standards may not be satisfied.

DISCLOSURE

Technical Problem

An object of the present invention devised to solve the problem lies in a method for efficiently performing a hand-over and an apparatus for carrying out the method.

Another object of the present invention devised to solve the problem lies in a method for enabling an MS which does not possess updated system information of a target BS to efficiently acquire system information of the target BS during a hand-over and an apparatus for carrying the method.

It will be appreciated by persons skilled in the art that the objects that can be achieved with the present invention are not limited to what has been particularly described hereinabove and the above and other objects that the present invention can achieve will be more clearly understood from the following detailed description.

Technical Solution

The objects of the present invention can be achieved by providing a method for enabling a mobile station to update system information of a target base station during a hand-over in a broadband wireless access system, the method including: receiving, from a serving base station, a broadcast message containing system information on at least one neighbor base station including the target base station with first change count information indicating a version of the system information; transmitting, to the serving base station, a first request message comprising the first change count information; and receiving, from the serving base station, a command message containing second change count information indicating a version of the system information currently possessed by the serving base station, when values of the first change count and the second change count are different from each other.

The method may further include transmitting a first request message containing the first change count information to the serving base station.

When values of the first change count information and the second change count information are different from each other, the command message may further contain delta information that is different from the system information contained in the broadcast message from among the system information currently possessed by the serving base station.

The command message may further contain coordination information for coordinating an EBB (Entry Before Break) hand-over when the values of the first change count information and the second change count information are different from each other, and the coordination information may contain interleaving interval information that indicates an interval in which the mobile station does not communicate with the serving base station depending on scheduling of the serving base station.

The method may further include receiving delta information at least once, which is different from the system information contained in the broadcast message from among updated system information of the target base station, through a header broadcasted by the target base station in the interleaving interval.

The method may further include updating the system information of the target base station using the delta information, and transmitting a second request message to the target base station using the updated system information.

To achieve the objects of the present invention, there is provided a method for enabling a serving base station to support target base station system information update of a mobile station during a hand-over in a broadband wireless access system, the method including: transmitting, to a mobile station, a broadcasting message containing system information on at least one neighbor base station including the target base station with first change count information indicating a version of the system information; receiving, from the mobile station, a request message containing the first change count information possessed by the mobile station; comparing second change count information for indicating a version of the system information currently possessed by the serving base station with the first change count information; and transmitting a command message containing the second change count information to the mobile station when values of the first change count information and the second change count information are different from each other.

The system information and the first change count information possessed by the mobile station may be acquired through a broadcast message periodically broadcasted by the serving base station.

The command message may further contain delta information that is different from the system information possessed by the mobile station from among the system information currently possessed by the serving base station when the values of the first change count information and the second change count information are different from each other.

The command message may further contain coordination information for coordinating an EBB (Entry Before Break) hand-over when the values of the first change count information and the second change count information are different from each other, and the coordination information may contain interleaving interval information for indicating an interval in which scheduling is not performed on the mobile station.

To achieve the objects of the present invention, there is provided a mobile station including a processor, and an RF module for transmitting/receiving RF signals to/from a serving base station and a target base station under the control of the processor, wherein the processor acquires system information on at least one neighbor base station including the target base station and first change count information for indicating a version of the system information through a broadcast message broadcasted by the serving base station, and controls the RF module to transmit a first request message comprising the first change count information to the serving base station, and to receive a command message containing second change count information indicating a version of the system information currently possessed by the serving base station, when values of the first change count and the second change count are different from each other.

The controller may control a first request message including the first change count information to be transmitted to the serving base station.

The command message may further contain delta information that is different from the system information contained in the broadcast message from among the system information currently possessed by the serving base station when values of the first change count information and the second change count information are different from each other.

The command message may further contain coordination information for coordinating an EBB (Entry Before Break) hand-over when the values of the first change count information and the second change count information are different from each other, and the coordination information may contain interleaving interval information that indicates an interval in which the mobile station does not communicate with the serving base station depending on scheduling of the serving base station.

The controller may control the mobile station to receive delta information at least once, which is different from the system information contained in the broadcast message from among updated system information of the target base station, through a header broadcasted by the target base station in the interleaving interval.

The controller may control the mobile station to update the system information of the target base station using the delta information and to transmit a second request message to the target base station using the updated system information.

Each change count information may correspond to a change count field, the broadcast message may be a neighbor advertisement (AAI_NBR-ADV) message, the header may be a superframe header (SFH), the command message is a hand-over command (AAI_HO-CMD) message, the first request message may be a hand-over request (AAI_HO-REQ) message, and the second request message may be a ranging request (AAI-RNG-REQ) message.

Advantageous Effects

According to embodiments of the present invention, following advantageous effects can be achieved.

An MS can perform a hand-over more efficiently.

Furthermore, when the MS does not have updated system information of a target BS, the MS can efficiently receive the updated system information during a hand-over.

It will be appreciated by persons skilled in the art that the effects that can be achieved with the present invention are not limited to what has been particularly described hereinabove and other advantages of the present invention will be more clearly understood from the following detailed description.

BEST MODE FOR CARRYING OUT THE INVENTION

Figure 1:
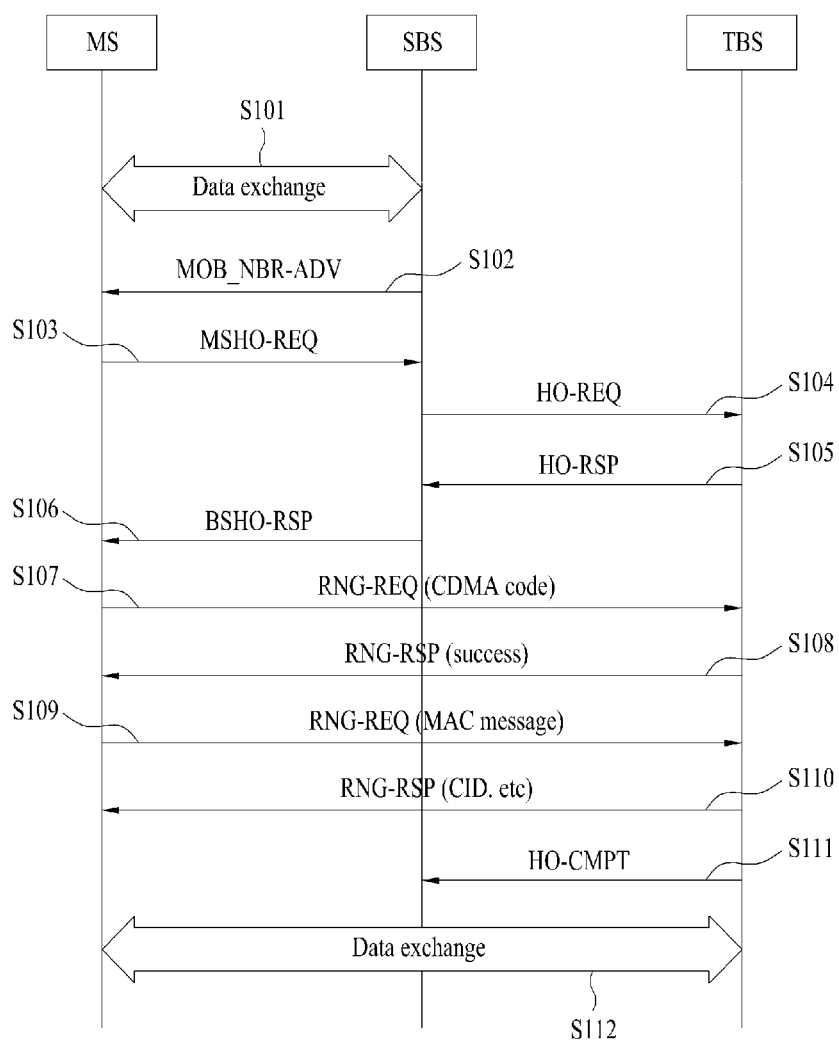
FIG. 1 shows an exemplary hand-over procedure which can be performed in an IEEE 802.16e system.
Figure 2:
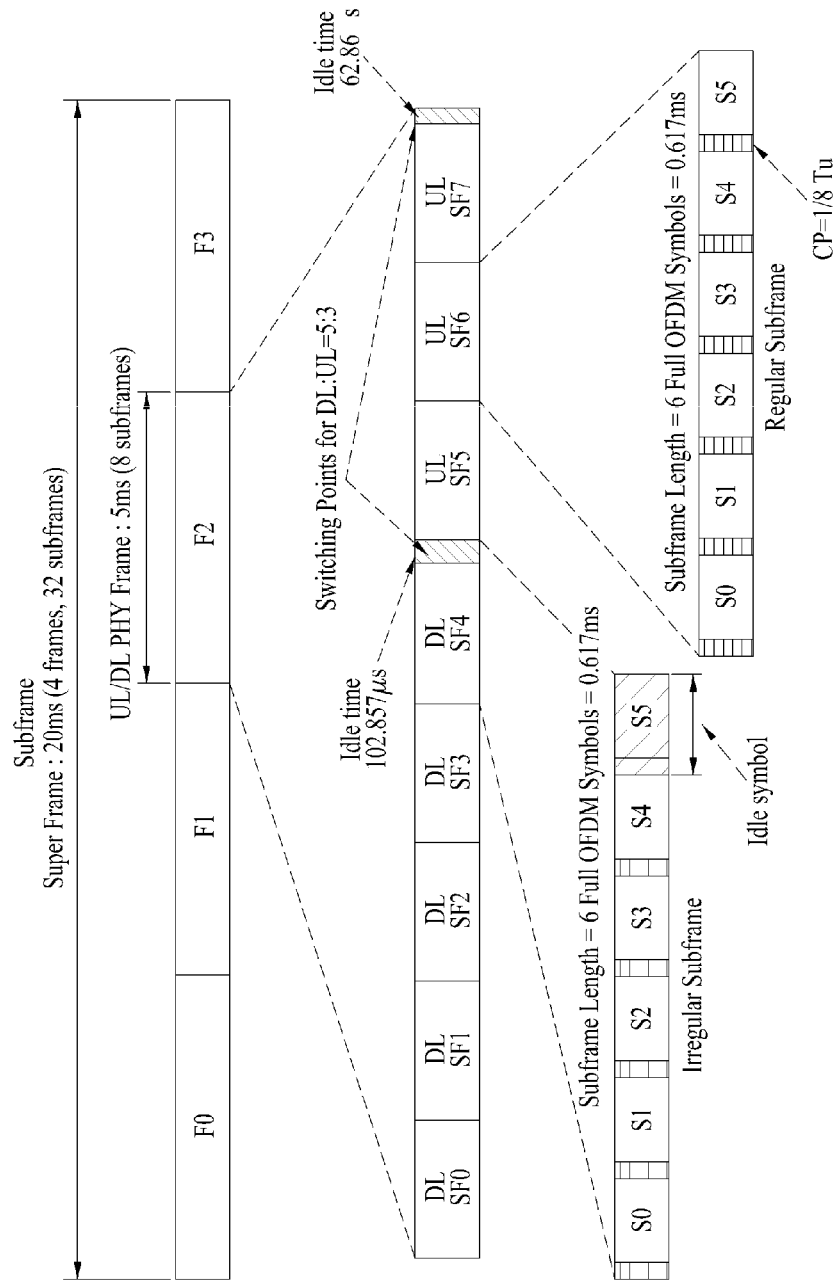
FIG. 2 shows an example of a physical frame structure used in a wireless wide area network (WAN) mobile communication system based on an IEEE 02.16 system.

To solve the aforementioned technical problems, the present invention discloses a method for efficiently receiving system information of a target BS during a hand-over and an apparatus for carrying out the method.

The aforementioned embodiments are achieved by combination of elements and features of the present invention in a predetermined manner. Each of the elements or features should be considered selectively unless specified separately. Each of the elements or features may be carried out without being combined with other elements or features. Also, some elements and/or features may be combined with one another to constitute the embodiments of the present invention. The order of operations described in the embodiments of the present invention may be changed. Some elements or features of one embodiment may be included in another embodiment, or may be replaced with corresponding structural elements or features of another embodiment.

Embodiments of the present invention are explained about data transmission and reception between a base station and a mobile station. Here, the base station means a terminal node of a network, which directly communicates with the mobile station. In this specification, specific operations performed by the base station may be carried out by an upper node of the base station according to circumstances.

In other words, it will be apparent that various operations performed for communication with the mobile station in the network which includes a plurality of network nodes along with the base station may be performed by the base station or network nodes other than the base station. The base station may be replaced with terms such as fixed station, Node B, eNode B (eNB), and Access Point (AP). Also, the user equipment may be replaced with terms such as Subscriber Station (SS), Mobile Subscriber Station (MSS), Mobile Terminal (MT) and a terminal.

The embodiments according to the present invention can be implemented by various means, for example, hardware, firmware, software, or combination thereof.

In a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention can be implemented by a type of a module, a procedure, or a function, which performs functions or operations described above. Software code may be stored in a memory unit and then may be executed by a processor. The memory unit may be located inside or outside the processor to transmit and receive data to and from the processor through various means which are well known.

The embodiments of the present invention may be supported by standardization documents disclosed in at least one of IEEE 802 system, 3GPP system, 3GPP LTE system and 3GPP2 system which are wireless access systems. That is, in the embodiments of the present invention, steps or parts that are not explained in order to disclose the technical spirit of the present invention can be supported by the above documents. All terms used in this specification can be explained by the above-mentioned standardization documents. In particular, the embodiments of the present invention can be supported by one or more selected from P802.16-2004, P802.16e-2005 and P802.16Rev2 which are standardization documents of IEEE 802.16 systems.

Specific terms used in the following description are provided for better understanding of the present invention and they may be changed into other forms without departing from the technical spirit of the present invention.

As described above, an MS needs to acquire system information of a target BS when performing a hand-over. The system information of the target BS may contain uplink/downlink resource allocation information, an uplink frequency reutilization rate, power control, ranging channel information, advanced MAP (A-MAP) information, backoff information, etc.

The MS can acquire the system information through a SFH of the target BS or a neighbor advertisement (AII_NBR-ADV) message broadcasted by a serving BS.

However, the MS may possess an SFH of a version older than a current SFH of a neighbor BS. This is a problem that may be generated because an AII_NBR-ADV message transmission period is longer than an SFH transmission period. This state may be referred to SFH mismatch between the MS and a specific BS.

The SFH mismatch may be generated when 1) an MS has not received an updated AAI_NBR-ADV message in which SFH update is reflected or 2) the MS performs a hand-over to a target BS before the AAI_NBR-ADV message in which SFH update is reflected is broadcasted.

When the SFH mismatch is generated, a method for enabling an MS to update SFH information of a target BS, proposed by the present invention, can be considered for two cases.

In the first case, the MS initiates a hand-over. In the second case, the BS initiates a hand-over.

The case in which the MS initiates a hand-over is explained first.

First Embodiment

An embodiment of the present invention provides a method for enabling an MS in an SFH mismatch state to efficiently receive updated system information of a target BS during a hand-over initiated by the MS.

In case of MS initiated hand-over, a method for updating an SFH mismatched with that of the target BS according to an embodiment of the present invention can be divided into the following three methods.

1. Method for transmitting mismatched an SFH difference value (SFH delta) information to the MS through a hand-over command (AAI_HO-CMD) message during a hand-over 2. Method for allowing a serving ABS (S-ABS) to coordinate an EBB (Entry Before Break) hand-over process in which the target BS directly updates an SFH during a hand-over 3. Method for allowing the S-ABS to reject the hand-over process initiated by the MS.

1) The first method is explained.

In accordance with one aspect of the present invention, when the MS initiates a hand-over by transmitting a hand-over request (AAI_HO-REQ) message, the AAI_HO-REQ message contains AAI_NBR-ADV change count information currently possessed by the MS.

Here, the AAI_NBR-ADV change count means the version of a current AAI_NBR-ADV message of the S-ABS. That is, an increase of the change count by 1 means that information included in the AAI_NBR-ADV message of the S-ABS has been updated.

In this case, it is desirable that the AAI_HO-REQ message includes a field as shown in the following Table 1.

Table 1 shows an example of a field added to the AAI_HO-REQ message according to an embodiment of the present invention.

TABLE 1

| Name | Value | Usage |
|---|---|---|
| ... | ... | ... |
| Change count | AAI NBR-ADV change count last received from the serving ABS | |
| ... | ... | ... |

A hand-over process when the aforementioned change count information is applied is explained with reference to FIG. 3.

Figure 3:
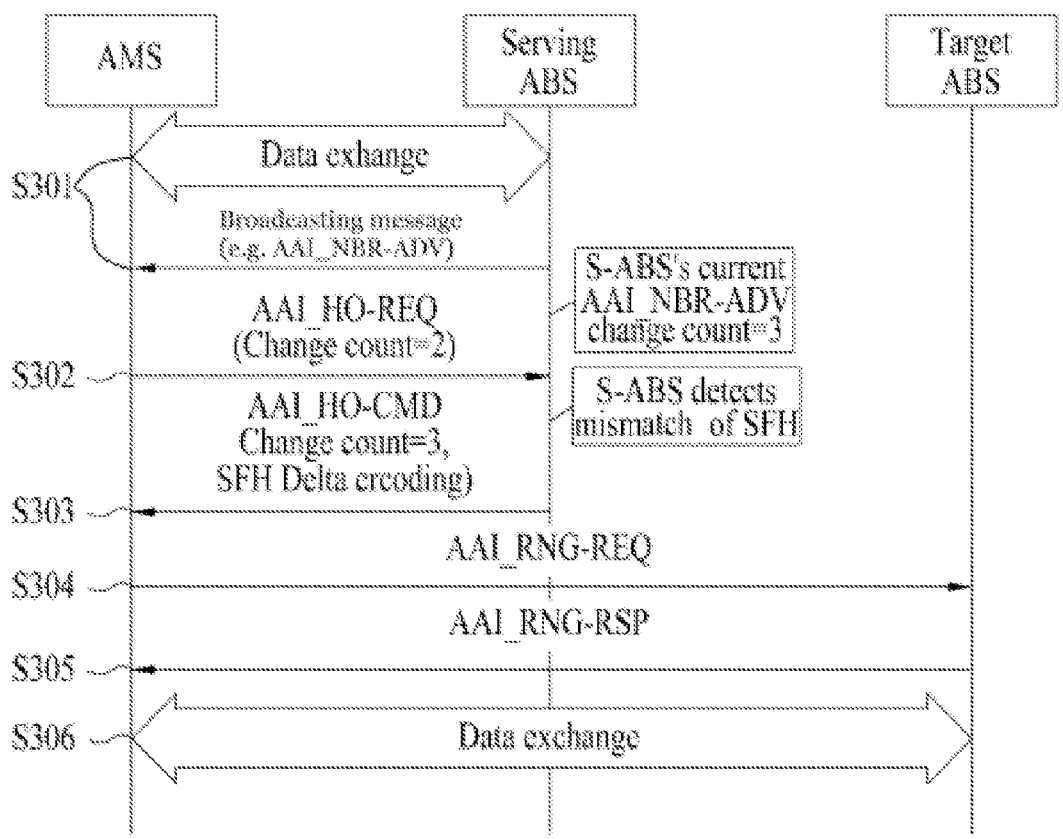
FIG. 3 shows an exemplary process of updating system information of a target BS during a hand-over according to an embodiment of the present invention.

FIG. 3 shows an exemplary process of updating system information during a hand-over according to an embodiment of the present invention.

Referring to FIG. 3, an MS may perform normal data exchange with an S-ABS and receive an AAI_NBR-ADV message containing system information of neighbor BSs from the S-ABS (301).

Here, it is assumed that an AAI_NBR-ADV change count is 2. The S-ABS updates the system information and the AAI_NBR-ADV change count is changed to 3.

When a predetermined hand-over condition is satisfied, the MS sets the AAI_NBR-ADV change count to 2 and transmits a hand-over request (AAI_HO-REQ) message to the S-ABS to initiate a hand-over (S302).

Upon reception of the hand-over request message from the MS, the S-ABS can be aware of that SFH mismatch is generated in the AAI_NBR-ADV message possessed by the MS, and thus the S-ABS sets the AAI_NBR-ADV change count to 3 in a hand-over command (AAI_HO-CMD) message, includes an SFH delta value according to a version change in the AAI_NBR-ADV message in the hand-over command message and transmits the hand-over command message including the SFH delta value to the MS (S303).

Accordingly, the MS can acquire updated system information of a target BS using the SFH delta value included in the hand-over command message, and then transmit a ranging request (AAI_RNG-REQ) message to the target BS (S304).

The target BS may transmit a ranging response (AAI_RNG-RSP) message as a response to the ranging request message transmitted from the MS (S305).

Then, the MS and the target BS can successfully finish the hand-over process and normally perform data exchange (S306).

2) The second method is explained.

In accordance with another aspect of the present invention, the MS adds the AAI_NBR-ADV change count information to the hand-over request message such that the S-ABS determines SFH mismatch state of the MS. However, the MS directly receives mismatch SFH information from the target BS through an EBB (Entry Before Break) hand-over instead of the hand-over command message in this method.

Here, the EBB hand-over means hand-over re-entry mode 1 in which the MS maintains connection with the S-ABS before entering the target BS to perform data exchange during a hand-over and decreases an interruption time.

To achieve this, the S-ABS can coordinate the EBB hand-over process such that the MS can directly receive the mismatch SFH information from the target BS. More specifically, the MS updates an SFH in the target BS in a hand-over re-entry interleaving interval in which the MS does not communicate with the S-ABS according to scheduling of the S-ABS, and continuously receives services from the S-ABS. The S-ABS may add at least one of SP scheduling periodicity information broadcasted by the target BS and SFH mismatch state indication information to a hand-over command (AAI_HO-CMD) message and transmit the hand-over command message including the corresponding information to the MS in order to allow the MS to receive only necessary SFH. The MS can perform the EBB hand-over process on the basis of the corresponding information.

In this case, it is desirable that the hand-over command (AAI_HO-CMD) message additionally includes fields as shown in the following Table 2.

Table 2 shows exemplary field forms included in the hand-over command message according to an embodiment of the present invention.

TABLE 2

| Name | Value | Usage |
|---|---|---|
| ... | ... | ... |
| Mode | 0b00: HO command; 0b01: Zone switch command from MZone to LZone; 0b10: AMS HO request rejected (ABS in list unavailable). In this case, AAI_HO-CMD message shall not include any target ABS. 0b11: HO reject | |

TABLE 2-continued

| Name | Value | Usage |
|---|---|---|
| Reject Reason | 0b00: T-ABS is full<br>0b01: SFH mismatch is detected with T-ABS | In case of Mode is set to 0b11, this parameter indicates the reason of HO rejection. |
| HO_Reentry_Mode | 1: the AMS maintains communication with Serving ABS while performing network reentry with the Target ABS (Mode = 0b00); or the AMS maintains communication with MZone while performing network reentry with LZone in the same frame or on another carrier (Mode = 0b01).<br>0: the AMS disconnects from the Serving ABS before performing network reentry with the Target ABS (Mode = 0b00); or the AMS disconnects from the MZone before performing network reentry with the LZone (Mode = 0b01). | Should be included when Mode = 0b00. Shall be included when Mode = 0b01. |
| HO_Reentry_Interleaving_Interval | If HO Reentry Interleaving Interval >0, the AMS performs network reentry to the target ABS within the HO Reentry Interleaving Interval and continues data transmission with the Serving ABS in the remaining time.<br>If HO Reentry Interleaving Interval = 0, the AMS performs multi-carrier EBB (Established Before Break) HO procedure per 16.2.8.2.9.2.2 | Shall be included when HO Reentry Mode is set to 1 |
| HO Reentry Iteration | The requested number of iterating HO Reentry Interval by an AMS. | Shall be included when HO Reentry interleaving interval >0 |
| SP scheduling periodicity information | 4 bit | Indicates the scheduling periodicity of SP1, SP2 and SP3 |
| ... | ... | ... |

Referring to Table 2, a mode field may be set as a specific value (0b11 in this case) in the AAI_HO-CMD message to indicate rejection of request for hand-over initiated by the MS. In this case, a reject reason field that indicates rejection reason may be additionally included in the AAI_HO-CMD command.

The reject reason field may be used to indicate an SFH mismatch state to the MS. More specifically, if the reject reason field is set as a specific value (for example, 0b01), the reject reason field can indicate that the MS is in the SFH mismatch state. When the reject reason field is set to a value different from the SFH mismatch state, it can inform the MS that the target BS cannot cover the MS any more.

In addition, the AAI_HO-CMD message may include SP scheduling periodicity information to inform the MS of a transmission period of each S-SFH SP.

The above-described SFH updating process using EBB is explained with reference to FIG. 4.

Figure 4:
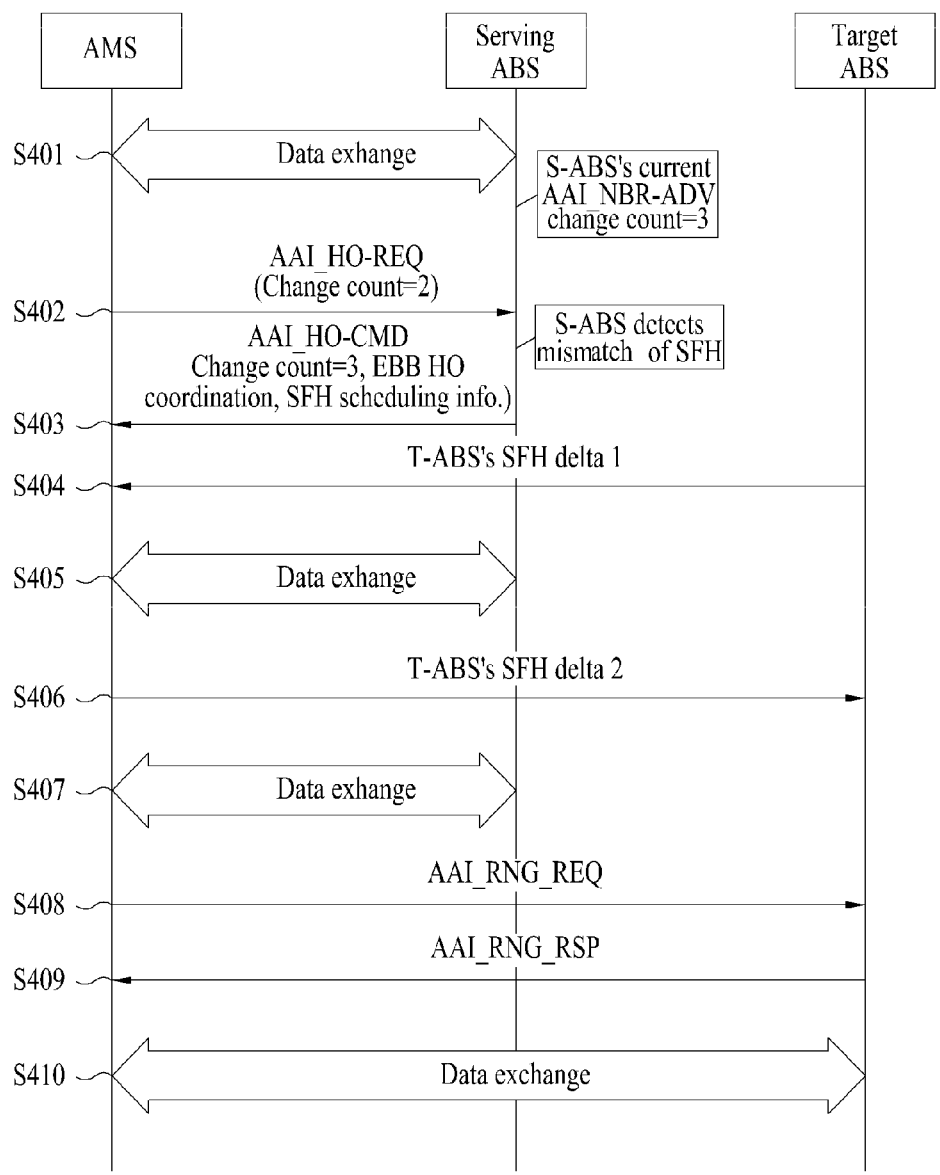
FIG. 4 shows an exemplary process of updating system information of a target BS through an EBB hand-over according to an embodiment of the present invention.

FIG. 4 shows an exemplary process of acquiring the system information of the target BS through an EBB hand-over.

Referring to FIG. 4, then MS may perform normal data exchange with the S-ABS and receive an AAI_NBR-ADV message including system information of neighbor BSs from the S-ABS (S401).

Here, it is assumed that the AAI_NBR-ADV change count is 2. The system information (that is, SFHs) of the neighbor BSs is updated in the S-ABS and the AAI_NBR-ADV change count is changed to 3.

If a predetermined hand-over condition is satisfied, the MS sets the AAI_NBR-ADV change count to 2 and transmits a hand-over request (AAI_HO-REQ) message to the S-ABS so as to initiate a hand-over (S402).

Upon reception of the hand-over request message from the MS, the S-ABS can recognize that mismatch is generated in the AAI_NBR-ADV message possessed by the MS, and thus it can coordinate an EBB hand-over. To achieve this, the S-ABS may add at least one of the change count set to 3, information for indicating whether or not SFH mismatch is generated, and EBB hand-over coordination information which informs the MS that the S-ABS will coordinate the EBB hand-over to a hand-over command message and transmit the hand-over command message including the corresponding information to the MS (S403).

Here, the EBB hand-over coordination information may contain information about an interval in which the MS does not communicate with the S-ABS depending on scheduling of the S-ABS, that is, a hand-over re-entry interleaving interval. Furthermore, the S-ABS may add SFH scheduling information that indicates a time when mismatch SFH information is transmitted from the target BS to the hand-over command message.

Upon reception of the hand-over command message, the MS can recognize an SFH mismatch state and directly receive mismatch SFH information (SFH delta 1) from the target BS in the hand-over re-entry interleaving interval using the information included in the hand-over command message (S404).

If the hand-over command message includes the SFH scheduling information of the target BS, the MS can receive the SHF with reference to the SFH scheduling information in step S404.

The MS can exchange data with the S-ABS according to scheduling of the S-ABS in an interval other than the hand-over re-entry interleaving interval (S405).

If mismatch SFH information is present even after the MS receives the SFH in step S404, the MS can additionally receive an SFH (SFH delta 2) of the target BS in a next hand-over re-entry interleaving interval and exchange data with the S-ABS according to scheduling of the S-ABS after the next hand-over re-entry interleaving interval (S406 and S407).

Then, the MS can transmit a ranging request message to the target BS as it acquires the updated system information of the target BS by receiving the SFH (S408).

The target BS transmits a ranging response message to the MS as a response to the ranging request message transmitted from the MS (S409).

Subsequently, the MS and the target BS can successfully finish the hand-over process and perform normal data exchange (S410).

3) The third method will now be explained.

In accordance with another aspect of the present invention, then MS adds AAI_NBR-ADV change count information to a hand-over request message such that the S-ABS determines an SFH mismatch state of the MS. However, when the MS is in the SFH mismatch state, the S-ABS rejects hand-over request of the MS such that the MS receives mismatch SHF information through a next AAI_NBR-ADV message broadcasted by the S-ABS. This is explained with reference to FIG. 5.

Figure 5:
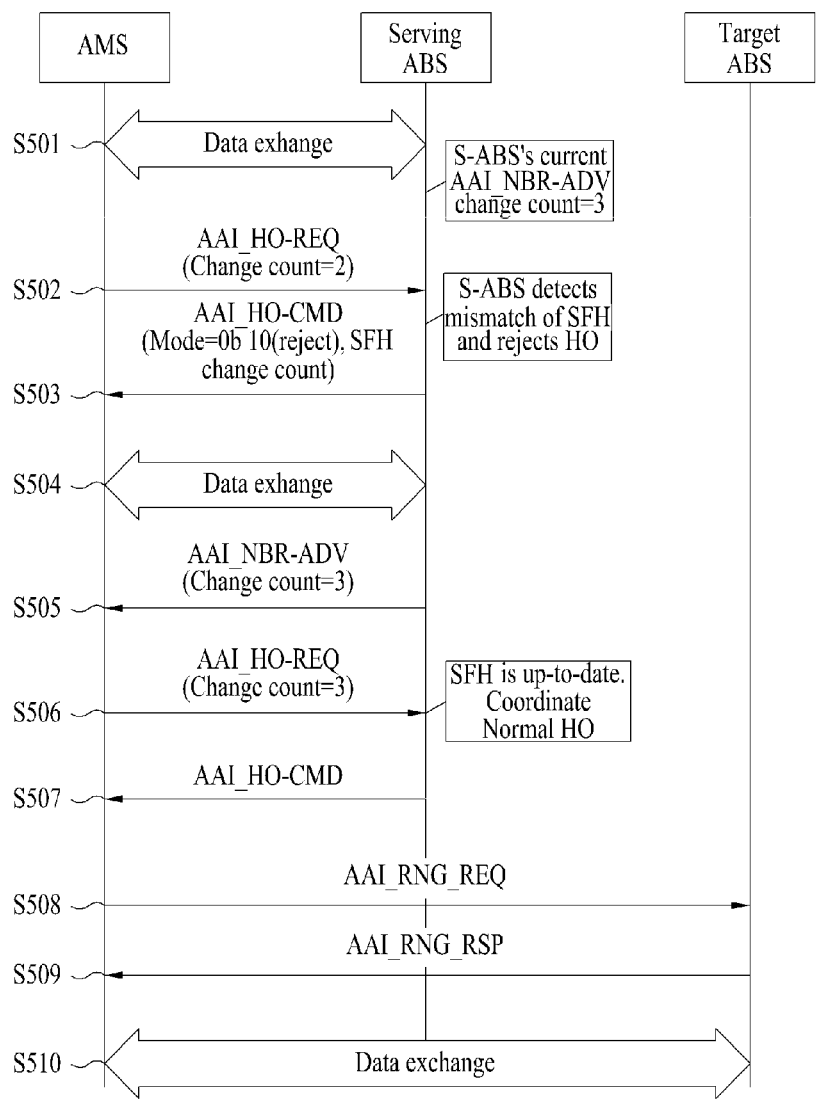
FIG. 5 shows an exemplary process of updating system information of a target BS using a neighbor advertisement message during a hand-over according to an embodiment of the present invention.

FIG. 5 shows an exemplary process of updating the system information of the target BS through an AAI_NBR-ADV message during a hand-over according to an embodiment of the present invention.

Referring to FIG. 5, the MS may perform normal data exchange with the S-ABS and receive an AAI_NBR-ADV message including system information of neighbor BSs from the S-ABS (S501).

Here, it is assumed that the AAI_NBR-ADV change count is 2. Then, the system information (that is, SFH) of the neighbor BSs is updated in the S-ABS, and the AAI_NBR-ADV change count is changed to 3.

When a predetermined hand-over condition is satisfied, the MS sets the AAI_NBR-ADV change count to 2 and transmits a hand-over request (AAI_HO-REQ) message to the S-ABS (S502).

Upon reception of the hand-over request message, the S-ABS can recognize that SFH mismatch is generated in the AAI_NBR-ADV message possessed by the MS, and thus it can reject the hand-over request from the MS such that the MS receives a next AAI_NBR-ADV message. To achieve this, the S-ABS may add at least one of the AAI_NBR-ADV change count set to 3 and mode information set to a hand-over reject indication value (for example, 0b10) to a hand-over command (AAI_HO-CMD) message and transmit the hand-over command message to the MS (S503).

When the MS receives the hand-over command message from the S-ABS, the MS can be aware of that the hand-over initiated by the MS is rejected due to its SFH mismatch. Accordingly, the MS can exchange data with the S-ABS (S504).

Then, the MS may receive the updated AAI_NBR-ADV message (change count=3) from the S-ABS (S505).

When the MS receives the updated AAI_NBR-ADV message, the MS can acquire the updated SFH (that is, system information) of the target BS and transmit a hand-over request (AAI_HO-REQ) message having the AAI_NBR-ADV change count set to 3 to the S-ABS to request the hand-over.

Upon reception of the hand-over request message from the MS, the S-ABS can be aware of that SFH mismatch is not generated in the MS, and thus S-ABS transmits a hand-over command message to the MS (S507).

The subsequent process corresponds to the general hand-over process so that explanation thereof is omitted.

A BS initiated hand-over in accordance with another embodiment of the present invention will be explained.

Second Embodiment

Another embodiment of the present invention provides a method for enabling an MS in an SFH mismatch state to efficiently receive updated system information of a target BS during a hand-over initiated by an S-ABS.

When the S-ABS initiates a hand-over, a method of updating an SFH mismatched with that of the target BS according to an embodiment of the present invention can be divided into the following two methods.

1. Method for enabling the MS to update all SFHs in the S-ABS, and then perform a hand-over 2. Method for enabling the MS to reject hand-over request of the S-ABS, and then request an EBB hand-over to directly receive an SFH from the target BS and update the directly received SFH 1) The first method is explained first.

In accordance with one aspect of the present invention, when the S-ABS transmits a hand-over command (AAI_HO-CMD) message to initiate a hand-over, and the MS recognizes SFH mismatch, the MS rejects the hand-over using a hand-over indication message. This method is explained with reference to FIG. 6.

Figure 6:
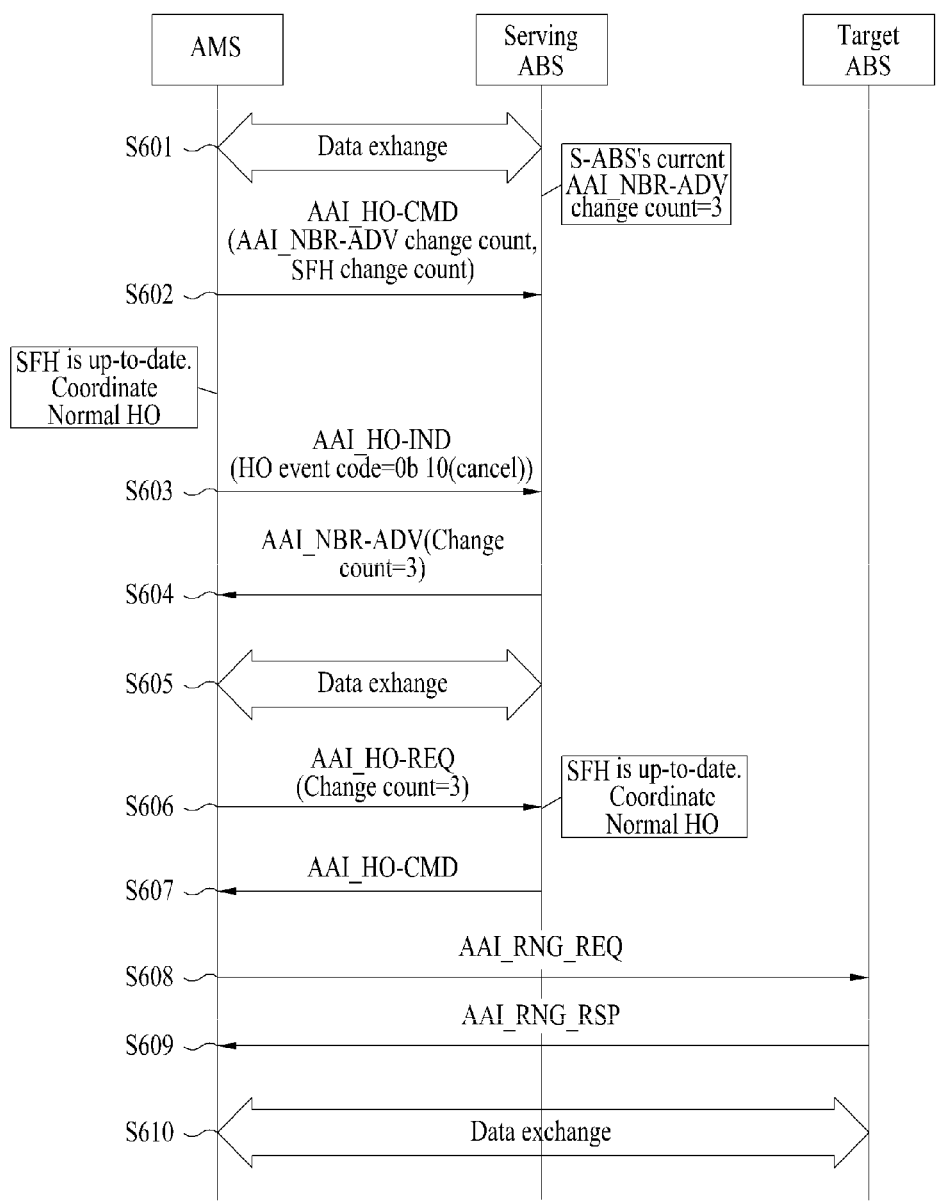
FIG. 6 shows an exemplary process of updating system information of a target BS during a hand-over according to another embodiment of the present invention.

FIG. 6 shows an exemplary process of updating the system information of the target BS during a hand-over according to another embodiment of the present invention.

Referring to FIG. 6, the MS may perform normal data exchange with the S-ABS and receive an AII_NBR-ADV message including system information (SFH information) of neighbor BSs from the S-ABS (S601).

At this time, it is assumed that the AAI_NBR-ADV change count is 2. The system information (that is, SFH) of the neighbor BSs is updated in the S-ABS and the AA_NBR-ADV change count is changed to 3.

When a predetermined hand-over condition is satisfied, the S-ABS sets the AAI_NBR-ADV change count is set to 3 and transmits a hand-over command (AAI_HO-CMD) message to the MS in order to initiate the hand-over. (S602).

Here, the hand-over command message may further contain an SFH counter of the neighbor BSs.

Upon reception of the hand-over command message, the MS can recognize that the MS is in an SFH mismatch state because the AAI_NBR-ADV change count of the S-ABS does not correspond to the AAI_NBR-ADV change count of the MS. Accordingly, the MS can set an event code of a hand-over indication (AAI_HO-IND) message to a value that indicates hand-over cancellation or rejection and transmit the hand-over indication message to the S-ABS (S603).

If the MS rejects the hand-over, the hand-over indication message may additionally include information that represents rejection reason. An example of the hand-over indication message including the information for representing rejection reason is explained with reference Table 3.

TABLE 3

| Name | Value | Usage |
|---|---|---|
| HO Event Code | 0b000: Target ABS selection in case of multiple candidate T-ABSs.<br>0b001: All target ABSs in AAI_HO-CMD are unreachable. In this case, the AMS shall include a new target ABS that was not included in AAI_HO-CMD.<br>0b010: AMS unable to stay connected to serving ABS until expiration of disconnect time.<br>0b011: HO cancel<br>0b100: HO reject | This is used to distinguish AAI HO-IND among different scenarios |
| Reject Reason | 0b00: SFH mismatch is detected with T-ABS | In case of HO Event Code is set to 0b100. This parameter indicates the reason of HO rejection. |
| ... | ... | ... |

Referring to FIG. 3, a value (for example, 0b100) that indicates hand-over rejection may be generated in a hand-over event code field of the hand-over indication message so as to reject the hand-over initiated by the S-ABS.

Furthermore, when the event code value is set to the value that indicates hand-over rejection, the hand-over indication message may additionally include a refection reason field that indicates rejection reason. If the rejection reason field is set to a specific value (for example, 0b00), this value can indicate that the MS is in an SFH mismatch state.

The hand-over indication message may further include change count information. In this case, it is possible to solve a problem that may be generated when a seamless hand-over is performed. That is, if it is determined that the MS has old-version system information of the target BS when the seamless hand-over is performed, the S-ABS can cancel the hand-over so as to prevent generation of an unnecessary interrupt time.

Referring back to FIG. 6, the MS may receive the updated AAI_NBR-ADV message in which the AAI_NBR-ADV change count is set to 3 from the S-ABS so as to update the SFH information of the neighbor BSs.

Then, the MS may transmit a hand-over request (AAI_HO-REQ) message in which the AAI_NBR-ADV change count is set to 3 to the S-ABS when a predetermined hand-over execution condition is satisfied while the MS exchanges data with the S-ABS (S605 and S606).

Upon reception of the hand-over request message from the MS, the S-ABS can recognize that SFH mismatch is not generated in the AAI_NBR-ADV information possessed by the MS, and thus transmit a hand-over command message to the MS (S607).

The subsequent process is similar to the general hand-over process so that explanation thereof is omitted.

2. The second method is explained.

In accordance with another aspect of the present invention, if the MS recognizes SFH mismatch when the S-ABS transmits a hand-over command (AAI_HO-CMD) message to initiate a hand-over, the MS rejects the hand-over through the hand-over indication message. However, the MS acquires mismatch SFH information from the target BS by requesting an EBB hand-over instead of acquiring the AAI_NBR-ADV message of the S-ABS.

This process is explained with reference to FIG. 7.

Figure 7:
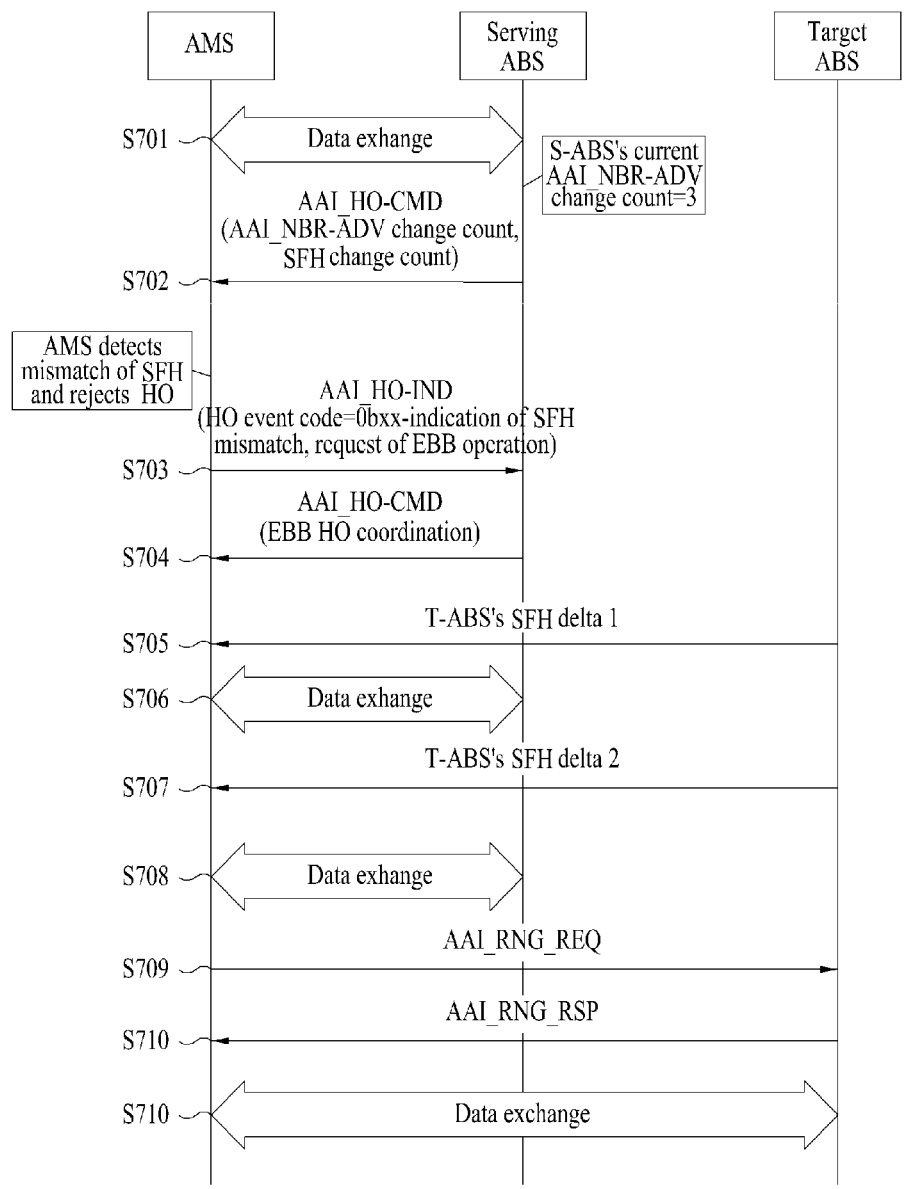
FIG. 7 shows an exemplary process of updating system information of a target BS during a hand-over according to another embodiment of the present invention.

FIG. 7 shows an exemplary process of updating the system information of the target BS during hand-over according to another embodiment of the present invention.

Referring to FIG. 7, the MS may perform normal data exchange with the S-ABS and receive an AAI_NBR-ADV message including system information (SFH information) of neighbor BSs from the S-AB (S701).

Here, it is assumed that the AAI_NBR-ADV change count is 2. The system information (that is, SFH) of the neighbor BSs is updated in the S-ABS and the AAI_NBR-ADV change count is changed to 3.

When a predetermined hand-over condition is satisfied, the S-ABS sets the AAI_NBT-ADV change count to 3 and transmits a hand-over command (AAI_HO-CMD) message to the MS to initiate the hand-over (S702).

At this time, the hand-over command message may further include superframe header change count of the neighbor BSs.

Upon reception of the hand-over command message, the MS can recognize that the MS is in an SFH mismatch state because the AAI_NBR-ADV change count does not correspond to the AAI_NBR-ADV change count of the MS. Accordingly, the MS may set the event code of the hand-over indication (AAI_HO-IND) message to a value (for example, one of 0b101 to 0b111) which requests an EBB hand-over according to SFH mismatch and transmit the hand-over indication message to the S-ABS (S703).

Upon reception of the hand-over indication message from the MS, the S-ABS can recognize that SFH mismatch is generated in the AAI_NBR-ADV message possessed by the MS, and thus the S-ABS can coordinate the EBB hand-over. To achieve this, the S-ABS may add EBB hand-over coordination information for informing the MS that the S-ABS will coordinate the EBB hand-over to a hand-over command (AAI_HO-CMD) message and transmit the hand-over command message including the EBB hand-over coordination information to the MS (S704).

Here, the EBB hand-over coordination information may include information on an interval in which the MS does not communicate with the S-ABS according to scheduling of the S-ABS, that is, a hand-over re-entry interleaving interval. Furthermore, the S-ABS may further add SFH scheduling information which indicates a time when mismatched SFH information is transmitted from the target BS to the hand-over command message.

The MS may directly receive the mismatch SFH information (SFH delta 1) from the target BS in the hand-over re-entry interleaving interval using the information included in the hand-over command message (S705).

If the hand-over command message includes the SFH scheduling information of the target BS, the MS can receive the SFH with reference to the SFH scheduling information in step S705.

The MS can exchange data with the S-ABS depending on scheduling of the S-ABS in an interval other than the hand-over re-entry interleaving interval (S706).

If mismatch SFH information is present even after the MS receives the SFH in step S705, the MS can additionally receive an SFH (SFH delta 2) of the target BS in a next hand-over re-entry interleaving interval and exchange data with the S-ABS depending on scheduling of the S-ABS after the corresponding interval (S707 and S708).

Then, the MS can transmit a ranging request message to the target BS as it acquires the updated system information of the target BS by receiving the SFH (S709).

The target BS transmits a ranging response message to the MS as a response to the ranging request message transmitted from the MS (S710).

Upon successful completion of the hand-over, the MS and the S-ABS can perform normal data exchange (S711).

In the above embodiments, though the MS acquires updated information about S-SFH SP1 and S-SFH SP2 of the target BS during a hand-over, there may exist a case in which SFH mismatch is generated only for S-SFH SP3. The S-SFH SP3 includes information required for AAI_REG-REQ/RSP handshake regardless of a ranging process performed during a hand-over. However, if this information is an old version or is not acquired by the MS, the process becomes inefficient in terms of latency. In this case, the MS may add information for requesting S-SFH SP3 information to the ranging request (AAI_RNG-REQ) message when transmitting the ranging request message to the target BS. Accordingly, the target BS can transmit the S-SFH SP3 information to the MS through the ranging response (AAI_RNG-RS) message.

Configurations of a Mobile Station and a Base Station

A mobile station (FBS) and a base station (MBS) for performing the above-describe embodiments according to an embodiment of the present invention are explained.

The FBS may operate as a transmitter on uplink and operate as a receiver on downlink. The MBS may operate as a receiver on uplink and operate as a transmitter on downlink. That is, the FBS and the MBS can include a transmitter and a receiver for information or data transmission.

The transmitter and the receiver may include a processor, a module, parts and/or means for performing the embodiments of the present invention. Particularly, the transmitter and the receiver may include a module for encoding message, a module for decoding encoded messages, and an antenna for transmitting and receiving messages. An example of the transmitter and receiver will now be explained with reference to FIG. 8.

Figure 8:
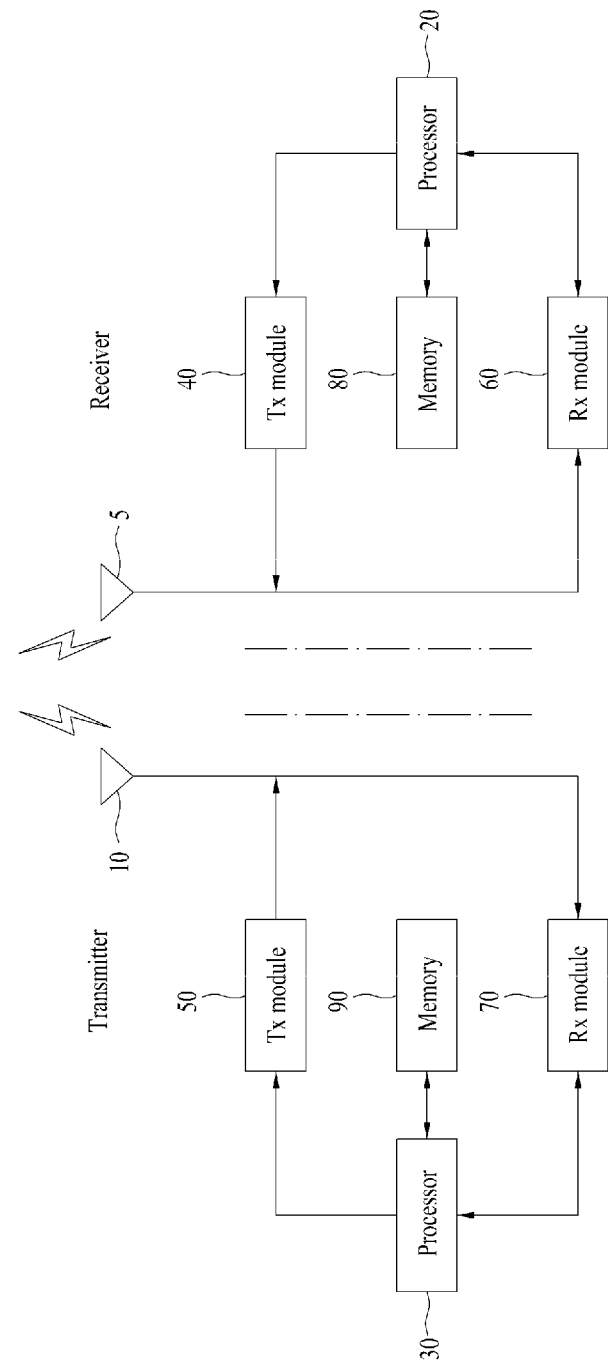
FIG. 8 is a block diagram showing an exemplary structure of a transmitter and a receiver.

FIG. 8 is a block diagram showing an example of a transmitter and a receiver according to another embodiment of the present invention.

Referring to FIG. 8, the left side shows a configuration of the transmitter and the right side shows a configuration of the receiver. The transmitter and the receiver may respectively include antennas 5 and 10, processors 20 and 30, transmission modules 40 and 50, receiving modules 60 and 70, and memories 80 and 90. The components can perform functions corresponding to each other. Each component will now be explained in more detail.

The antennas 5 and 10 transmit signals generated from the transmission modules 40 and 50 to an external device or receive external RF signals and transmit the external RF signals to the receiving module 60 and 70. If MIMO (Multi-Input Multi-Output) function is used, the transmitter and the receiver may include more than two antennas.

An antenna, a transmission module and a receiving module can construct an RF module.

The processors 20 and 30 generally control the overall operation of the FBS. For example, it is possible to perform a controller function, a function of variably controlling a medium access control (MAC) frame depending on service characteristic and communication environment, a hand-over function, and authentication and encryption functions, etc. More specifically, the processors 20 and 30 can perform the overall control operation for performing the aforementioned hand-over processes.

Particularly, the processor of the FBS can acquire AAI_NBR-ADV change count information and system information (that is, SFH information) of neighbor BSs through an AAI_NBR-ADV message broadcasted by an S-ABS.

The processor can determine whether or not a predetermined hand-over condition is satisfied and, when the hand-over condition is satisfied, control a hand-over request message including the acquired AAI_NBR-ADV change count information to be transmitted to the S-ABS so as to request the S-ABS to perform the hand-over. This process is not performed if the hand-over is initiated by the S-ABS.

The FBS can determine whether or not the FBS is in an SFH mismatch state using the change count information included in the hand-over command message received from the S-ABS. Accordingly, the processor can control the FBS to directly receive an updated SFH from the target BS through an EBB hand-over or acquire mismatch SFH information through a hand-over command message. Otherwise, the processor can inform the S-ABS of rejection of the hand-over and update the system information of the target BS through a next AAI_NBR-ADV message of an updated version, received from the S-ABS.

The processor can perform the overall control operations described in the above embodiments explained with reference to FIGS. 3 to 7.

The transmission modules 40 and 50 may perform coding and modulation on data scheduled by the processors 20 and 30 and transmitted to an external device, and then transmit the coded and modulated data to the antenna 10.

The receiving modules 60 and 70 perform decoding and demodulation on external RF signals received through the antennas 5 and 10 to restore the signals into the original data form and transmit the restored signals to the processors 20 and 30.

The memories 80 and 90 may store programs for executing processing and control of the processors 20 and 30 and temporarily store input/output data (for example, system information of the target BS). Furthermore, the memories 80 and 80 may include at least one of a flash memory, a hard disc type storage medium, a multimedia card micro type storage medium, a card type memory (for example, SD or XD memory, etc.), RAM (Random Access Memory), SRAM (Static Random Access Memory), ROM (Read-Only Memory), EEPROM (Electrically Erasable Programmable Read-Only Memory), PROM (Programmable Read-Only Memory), a magnetic memory, a magnetic disc, and an optical disc.

The base station may perform a controller function for performing the embodiments of the present invention, an OFDMA (Orthogonal Frequency Division Multiple Access) packet scheduling function, a TDD (Time Division Duplex) packet scheduling and channel multiplexing function, a function of variably controlling a MAC frame depending on service characteristic and transmission environment, a high-speed traffic real-time control function, a hand-over function, an authentication and encryption function, a packet modulation and demodulation function for data transmission, a high-speed channel coding function, and a real-time modem control function through at least one of the above-mentioned modules or further include additional means, modules or parts for executing these functions.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention.

INDUSTRIAL APPLICABILITY

The embodiment of the present invention can be applied to a variety of wireless access systems. Examples of various wireless access systems include 3GPP (3$^{rd}$ Generation Partnership Project), 3GPP2 and/or IEEE 802.xx (Institute of Electrical and Electronic Engineers 802) systems. The embodiments of the present invention can be applied to any technology field using the various wireless access systems in addition to the various wireless access systems.

The invention claimed is:

1. A method for enabling a mobile station to update system information of a target base station during a hand-over in a broadband wireless access system, the method comprising:
receiving, from a serving base station, a broadcast message containing system information on at least one neighbor base station including the target base station with first change count information indicating a version of the system information
transmitting, to the serving base station, a first request message comprising the first change count information; and
receiving, from the serving base station, a command message containing second change count information indicating a version of the system information currently possessed by the serving base station, when values of the first change count information and the second change count information are different from each other.

2. The method according to claim 1, wherein the command message further contains delta information that is different from the system information contained in the broadcast message from among the system information currently possessed by the serving base station.

3. The method according to claim 1, wherein the command message further contains coordination information for coordinating an EBB (Entry Before Break) hand-over when the values of the first change count information and the second change count information are different from each other, and the coordination information contains interleaving interval information that indicates an interval in which the mobile station does not communicate with the serving base station depending on scheduling of the serving base station.

4. The method according to claim 3, further comprising receiving delta information at least once, which is different from the system information contained in the broadcast message from among updated system information of the target base station, through a header broadcasted by the target base station in the interleaving interval.

5. The method according to claim 2 or 4, further comprising:
updating the system information of the target base station using the delta information; and
transmitting a second request message to the target base station using the updated system information.

6. The method according to claim 5, wherein each change count information corresponds to a change count field, the broadcast message is a neighbor advertisement (AAI_NBR-ADV) message, the header is a superframe header (SFH), the command message is a hand-over command (AAI_HO-CMD) message, the first request message is a hand-over request (AAI_HO-REQ) message, and the second request message is a ranging request (AAI-RNG-REQ) message.

7. A method for enabling a serving base station to support target base station system information update of a mobile station during a hand-over in a broadband wireless access system, the method comprising:
transmitting, to the mobile station, a broadcast message containing system information on at least one neighbor base station including the target base station with first change count information indicating a version of the system information;
receiving, from the mobile station, a request message containing the first change count information possessed by the mobile station;
comparing second change count information for indicating a version of the system information currently possessed by the serving base station with the first change count information; and
transmitting a command message containing the second change count information to the mobile station, when values of the first change count information and the second change count information are different from each other.

8. The method according to claim 7, wherein the command message further contains delta information that is different from the system information possessed by the mobile station from among the system information currently possessed by the serving base station.

9. The method according to claim 7, wherein the command message further contains coordination information for coordinating an EBB (Entry Before Break) hand-over when the values of the first change count information and the second change count information are different from each other, and the coordination information contains interleaving interval information for indicating an interval in which scheduling is not performed on the mobile station.

10. The method according to claim 9, wherein each change count information corresponds to a change count field, the broadcast message is a neighbor advertisement (AAI_NBR-ADV) message, the command message is a hand-over command (AAI_HO-CMD) message, and the request message is a hand-over request (AAI_HO-REQ) message.

11. A mobile station comprising:
a processor; and
an RF module for transmitting/receiving RF signals to/from a serving base station and a target base station under the control of the processor,
wherein the processor acquires system information on at least one neighbor base station including the target base station and first change count information indicating a version of the system information through a broadcast message broadcasted by the serving base station, and controls the RF module mobile station to transmit a first request message comprising the first change count information to the serving base station, and to receive a command message containing second change count information indicating a version of the system information currently possessed by the serving base station, when values of the first change count information and the second change count information are different from each other.

12. The mobile station according to claim 11, wherein the command message further contains delta information that is different from the system information contained in the broadcast message from among the system information currently possessed by the serving base station.

13. The mobile station according to claim 11, wherein the command message further contains coordination information for coordinating an EBB (Entry Before Break) hand-over when the values of the first change count information and the second change count information are different from each other, and the coordination information contains interleaving interval information that indicates an interval in which the mobile station does not communicate with the serving base station depending on scheduling of the serving base station.

14. The mobile station according to claim 13, wherein the controller controls the mobile station to receive delta information at least once, which is different from the system information contained in the broadcast message from among updated system information of the target base station, through a header broadcasted by the target base station in the interleaving interval.

15. The mobile station according to claim 12 or 14, wherein the processor controls the mobile station to update the system information of the target base station using the delta information and to transmit a second request message to the target base station using the updated system information.

16. The mobile station according to claim 15, wherein each change count information corresponds to a change count field, the broadcast message is a neighbor advertisement (AAI_NBR-ADV) message, the header is a superframe header (SFH), the command message is a hand-over command (AAI_HO-CMD) message, the first request message is a hand-over request (AAI_HO-REQ) message, and the second request message is a ranging request (AAI-RNG-REQ) message.

* * * * *